US010131285B1

(12) United States Patent
Healy et al.

(10) Patent No.: US 10,131,285 B1
(45) Date of Patent: Nov. 20, 2018

(54) PROPANE TANK STABILIZER (71) Applicants: Mike Healy, Corvallis, OR (US);
Connie Healy, Corvallis, OR (US)

(72) Inventors: Mike Healy, Corvallis, OR (US);
Connie Healy, Corvallis, OR (US)

( * ) Notice: Subject to any disclaimer, the term of this patent is extended or adjusted under 35 U.S.C. 154(b) by 0 days.

(21) Appl. No.: 15/720,041

(22) Filed: Sep. 29, 2017

(51) Int. Cl.
*B60R 9/00* (2006.01)
*B60R 11/00* (2006.01)
*F17C 13/08* (2006.01)

(52) U.S. Cl.
CPC ............... *B60R 9/00* (2013.01); *B60R 11/00* (2013.01); *F17C 13/084* (2013.01); *B60R 2011/0071* (2013.01); *F17C 2201/0104* (2013.01); *F17C 2205/0157* (2013.01); *F17C 2221/035* (2013.01); *F17C 2270/0745* (2013.01)

(58) Field of Classification Search
CPC ... B60R 9/00; B60R 11/00; B60R 2011/0071; F17C 13/084; F17C 2201/0104; F17C 2205/0157; F17C 2221/035; F17C 2270/0745
USPC .......................................................... 224/404
See application file for complete search history.

(56) References Cited

U.S. PATENT DOCUMENTS

| | | | | |
|---|---|---|---|---|
| 1,622,587 A | * | 3/1927 | Housel | F24C 15/10 126/215 |
| 4,932,621 A | * | 6/1990 | Kowk | F16M 13/00 248/146 |
| 5,025,935 A | * | 6/1991 | Hadachek | B63C 11/02 211/60.1 |
| D331,792 S | * | 12/1992 | Wilcox | D23/206 |
| 5,292,140 A | * | 3/1994 | Laing | B62B 5/0083 220/737 |
| D385,615 S | | 10/1997 | St-Louis | |
| 5,799,849 A | | 9/1998 | Beer | |
| 5,813,643 A | | 9/1998 | Zybert | |
| 6,863,198 B1 | * | 3/2005 | Darby | B60R 7/02 224/403 |
| D523,518 S | * | 6/2006 | Moldenhauer | D23/206 |
| 7,077,269 B2 | * | 7/2006 | Kissell | B65D 61/00 206/446 |

(Continued)

*Primary Examiner* — Peter Helvey
(74) *Attorney, Agent, or Firm* — Stewart Myers (57) ABSTRACT

A cylinder holder is provided for supporting a cylinder while the assembly rests on a generally horizontally oriented transport surface. A tank contacting area is provided which has a tank contacting surface radially disposed therein which contacts a lower tank outer surface of the cylindrical tank in close proximity to a sealed end. The tank contacting chamber also has an extension disposed therein to extend outward from a lower extent of the tank contacting surface. This extension contacts the transport surface while the cylindrical tank is positioned within the tank contacting chamber. Connection means are provided to position the support surface relative to the tank contacting chamber. Binding means are provided to produce a compression contact between at least a portion of the tank contacting surface of the tank contacting chamber and the lower tank outer surface of the cylindrical tank while the cylindrical tank is positioned within the tank contacting chamber. This combination provides for the cylinder holder to be transported on a vehicle while allowing for the cylindrical tank to be unattendedly positioned in a vertically oriented position on the vehicle surface.

20 Claims, 6 Drawing Sheets

(56) References Cited

U.S. PATENT DOCUMENTS

| | | | |
|---|---|---|---|
| 7,726,621 B1* | 6/2010 | Dellinger | B44D 3/14 |
| | | | 220/737 |
| D665,871 S * | 8/2012 | Coupe | D23/206 |
| D682,982 S * | 5/2013 | Wood | D23/206 |
| 9,744,909 B2* | 8/2017 | Proulx | B60R 7/08 |
| 9,925,909 B2* | 3/2018 | Byham | B60P 7/0807 |

* cited by examiner

PROPANE TANK STABILIZER

BACKGROUND OF THE INVENTION

Generally the invention relates to a holder for cylinders. More specifically the invention relates to such a holder for a propane tank having a cylindrical shape where the cylindrical tank is to be unattendedly held in a vertically oriented position on a horizontally oriented surface.

FIELD OF THE INVENTION

Various attempts have been made to provide a holder for cylinders. These attempts have been less efficient than desired. As such, it may be appreciated that there continues to be a need for a holder which may be easily manufactured and which increases the supporting surface area to stabilize the cylinder while the cylinder rests upright in a generally vertically orientated position, particularly during transport of that cylinder in a vehicle. The present invention substantially fulfills these needs.

Propane is sold by distributers in tanks of different sizes that contain different quantities of propane. These tanks are frequently sold to individuals for personal use such as at parties and other social functions. The most popular size is the 20 lb tank used to hold fuel for residential barbecues. Barbecue tanks hold approximately 4.7 gallons of propane and are difficult to handle. They are unwieldy and heavy and are difficult to transport, frequently being placed in the trunk of a car or in the bed of a pick-up truck. The shape of the tanks is cylindrical, with the height being greater than the diameter. The most stable position is horizontal, however, unless otherwise restrained, the cylindrical shape of the tank causes it to roll.

Various pallets are available for transporting and storing tanks. However, these devices typically are designed to hold a plurality of tanks, and are useful for truckers to transport a plurality of tanks from the refinery to the distributor, but are not of much use to the individual who typically must transport the tank from the distributor to his/her home.

One such device, set forth in U.S. Pat. No. 5,769,003 to Rose et al. discloses a twin sheet pallet formed from a pair of thermoplastic material sheets comprising top and bottom platforms with a plurality of four columns projecting from the bottom platform to provide support for the device when loaded with four barrels or tanks. A plurality of parallel ribs provides both a method of joining the platforms as well as rigidity. A series of legs extending down from the bottom surface corresponds with a series of pockets in the top surface to allow the devices to be nested when not in use.

U.S. Pat. No. 5,224,678 to McClellan discloses a stacking and transporting device for a pair of propane tanks. The upper surface includes a pair of saddles for receiving a horizontally-oriented propane tank over a vertically-oriented propane tank. The device also includes apertures through the cylindrical side of the device to permit ready access for propane-dispensing means such as hoses connected to a valve.

Another device set forth in U.S. Pat. No. 4,354,599 to Brown et al. discloses a saddle adapted to hold and restrain a pair of tanks on top of each other. The saddle has a concave bottom portion that rests atop an upright or vertically oriented tank and a top portion that includes a pair of spaced shoulders to support the horizontally oriented tank.

However, none of the prior art devices addresses the problem associated with transporting individual tanks of propane. What is needed is a lightweight device to facilitate handling of a tank of propane, while also providing the required stability to transport a tank of propane on the bed of a pick-up truck.

Various devices have been developed for the transportation of a single propane tank. However, these devices are either complicated to use, difficult to load with the propane tank or are unstable when loaded with a propane tank. Therefore, what is needed is a lightweight and easy to use device to facilitate handling of a propane tank, while also providing the required stability to transport a propane tank on the bed of a pick-up truck or in the trunk or rear of a vehicle.

While other devices stabilize a propane tank to an extent they have no feature about them that fastens them securely to the bed of pickup to keep them from sliding or tipping over unless they are permanently attached or tied with bungee cord or by other means. This invention solves that problem without being attached in a permanent manner.

The invention described here reduces if not eliminates the problem of sliding, tipping over and rolling without the aid of tarp ties or other tie downs that are awkward and time consuming to install. The invention described here is put in place in seconds and removed in same.

BRIEF SUMMARY OF THE INVENTION

As stated above, propane tanks are used by millions of people for backyard barbecues, outdoor fire pits, boats, RV campers, portable heaters, etc. portable propane tanks come in various shapes and sizes including 5 lb., 11 lb., 20 lb., 30 lb. and 40 lb. The most common portable tank size is 20 lbs. Propane bottles are usually transported in the back of a truck and more often than not, they are unsecured and are free to roll around. Transporting unsupported bottles exposes them to potential damage such as dents and possible harm to the valve. A cylindrical tank support base ring is used to keep the cylindrical tank in an upright position and supported in a stable manner. Typically, the tank base ring has a smaller diameter than the diameter of the cylindrical tank itself causing tank to tip over easily which allows a tank to roll around scratching paint or damaging the tank or other items being transported. Since the portable tank typically is never completely emptied of the liquid propane the combination of a puncture and spark could possibly explode causing serious damage and injury. The invention claimed here solves this problem.

A stabilizer and tank stays right where you place it, it does not slide, scratch, tip, or roll around damaging the tank, your vehicle or other items you may have in vehicle The claimed invention differs from what currently exists. Prior to this invention the other devices in this field do not totally keep tanks from sliding or tipping over when being transported in bed of pickup without the aid of straps or tie-downs. This invention renders stabilizer and tank virtually impossible to slide or tip over by being held in place with a device that is unlike any other in the field of tank stabilizing.

This invention is an improvement on what currently exists. Prior to this invention the other devices in this field do not totally keep tanks from sliding or tipping over when being transported in bed of pickup without the aid of straps or tie-downs. This invention renders stabilizer and tank virtually impossible to slide or tip over by being held in place with a device that is unlike any other in the field of tank stabilizing.

While other tank stabilizers provide some stabilization, even under normal transport conditions they can and will slide and tip over while braking vehicle quickly, sharp cornering of vehicle, or traveling off road while in transport.

The invention described here reduces, if not eliminates, the problem of sliding, tipping over and rolling without the aid of tarp ties or other tie downs that are awkward and time consuming to install. The invention described here is put in place in seconds and removed in same.

Also, the tail or base could be used in various ways as a grip for tie downs or for motor bikes, ATV'S, or garbage cans while transporting.

Other novel features which are characteristics of the invention, as to organization and method of operation, together with further and advantages thereof will be better understood from the following description considered in connection with the accompanying figures, in which preferred embodiments of the invention are illustrated by way of example. It is to be expressly understood, however, that the figures are for illustration and description only and are not intended as a definition of the limits of the invention. The various features of novelty which characterize the invention are pointed out with particularity in the following description. The invention resides not in any one of these features taken alone, but rather in the particular combination of all of its structures for the functions specified.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method(s) or apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Referring now to FIGS. 1-6 that will be discussed together, a base (101) is preferably (but not necessarily) 16" wide & 20½" long. Preferably made of but not limited to 14 gauge mild steel. Some other elements that might be used instead of steel might include a composite fiberglass or molded plastic or hard plastic.

A propane tank collar (102) is about 41½" around and 1-2" wide made preferably but not limited to 11 gauge mild steel. Some other elements could possibly include molded plastic or composite fiberglass or other hard plastic that is strong enough as to not compromise overall strength of invention.

A retention flange (100) is approximately 16" wide and is made from the same or similar material as the base (101). The retention flange (100) is oriented roughly at a 90-degree angle from the base (101) and extends downward perpendicularly from the base (101).

The base (101) and collar (102) are connected to a transition area (103) that is curved to join the two elements (101) (102) in roughly a 90-degree orientation. That is, the base (101) and the collar (102) extend primarily in tangential planes and are connected together by a curved or sloped transition area (103) that surrounds the collar.

The base (101) has been cut out of sheet metal or plastic about 16"×21". The long end has been bent to a 90° angle about 1½" long. This creates the retention flange (100) of the stabilizer. The base (100) also has a hole cut out of center of top edge about 14" in diameter.

A piece of metal or plastic is rolled into the shape of circle with a diameter about of about 40½", or slightly larger than the diameter of an average propane tank. The circle forms the collar (102) in which a propane tank (105) is secured.

The collar (102) is mated to the transition area (103), or can be formed as part of the transition area (103) from the same material. On the opposite end of the transition area (103), is attached the base (101). The base (101) can be formed as part of the same material as the transition area (103) and the collar (102), or may be formed from a different area.

A tightening knob (104) can be included with some embodiments of the present invention to further secure the tank (105) within the invention. The tightening knob (104) is placed on one side of the collar (102) and comprises a housing within which a knob is attached to a threaded bolt. The threaded bolt passes through the collar (102) and either contacts the tank (105) directly, or is attached to a foot that contacts the tank (105). When the tightening knob (104) is rotated, the end of the bolt moves toward or away from the tank (105) within the collar. The knob (104) is designed so that a user can tighten it against the tank until a desired level of tension is reached.

In some embodiments of the present invention, a rubber coating is applied to all metal parts.

In some embodiments of the present invention, the stabilizer is also cone shaped.

One embodiment of the present invention can be made by rolling a piece of steel strap into the shape of circle with a diameter about 40½" slightly larger than the diameter of an average propane tank. This is rolled piece is called the collar (102). A second piece of steel is roughly shaped into a funnel and attached to the outside edges of the collar (102). The collar (102) is attached to the second piece of steel via spot-welding if metal. The second piece of metal is called the transition area (103) and is used to join the collar (102) to a base (101).

The base (101) has been cut out of sheet metal about 16'×21'. The long end has been bent to a 90° angle about 1½" long. This creates the retention flange (100) of the stabilizer. The base (101) also has a hole cut out of center of top edge about 14" in diameter. A rubber pad or mat can be adhesively attached to bottom of the base to provide a cushion for the bottom of stabilizer & bottom of the tank (105). A rubber coating can be applied to all metal parts. the stabilizer is also cone shaped (bigger at bottom than top) for better stability and enabling stabilizers to be stacked one on top of another so as to take up minimal space as possible with multiple tank stabilizers when not in use.

Figure 1:
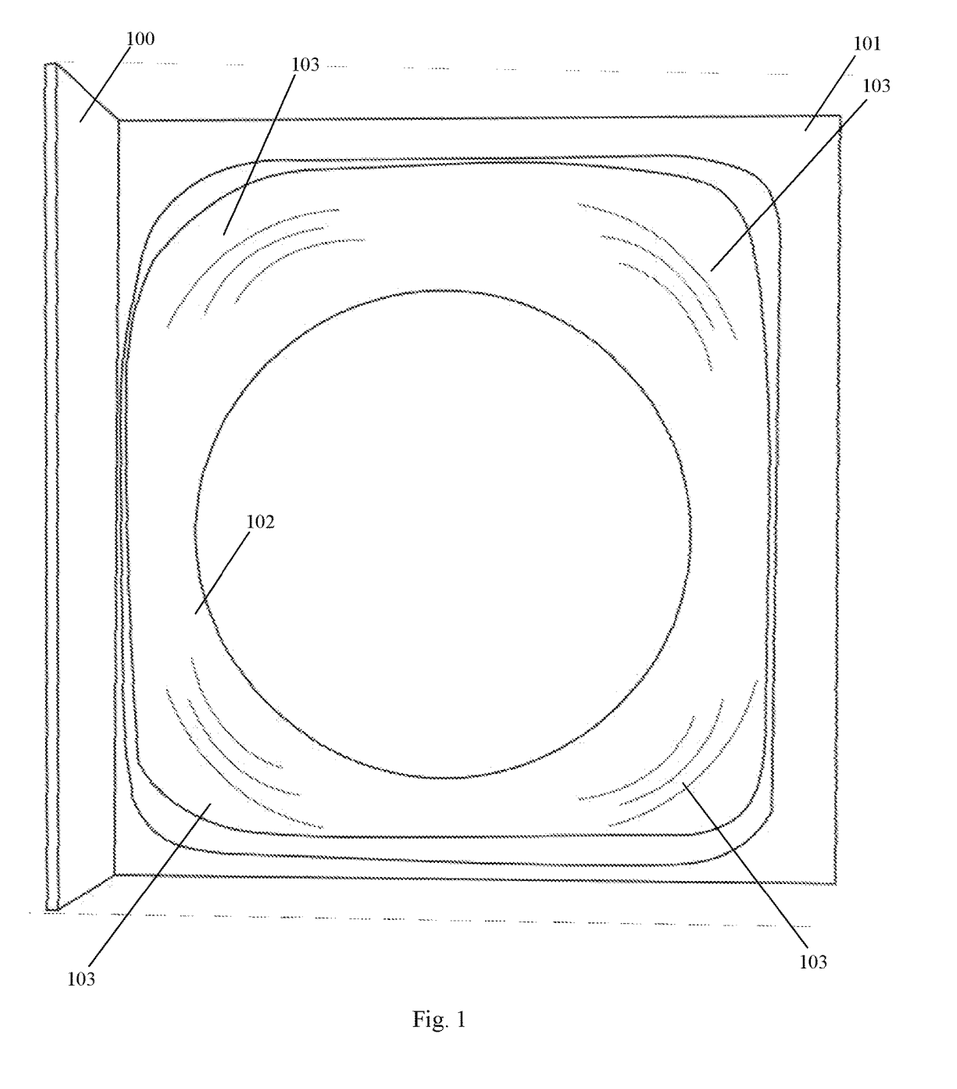
FIG. 1 is a bottom view of a propane tank stabilizer as according to an embodiment of the present invention.
Figure 2:
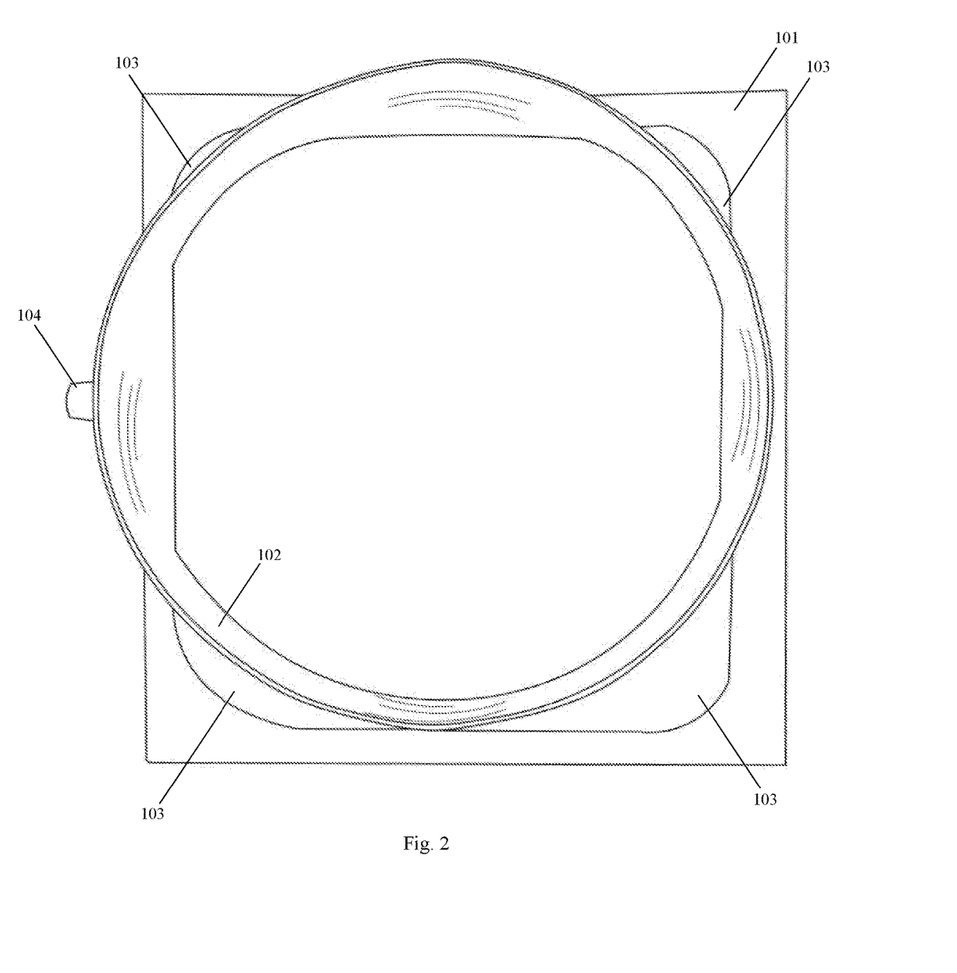
FIG. 2 is a top view of a propane tank stabilizer as according to an embodiment of the present invention.
Figure 3:
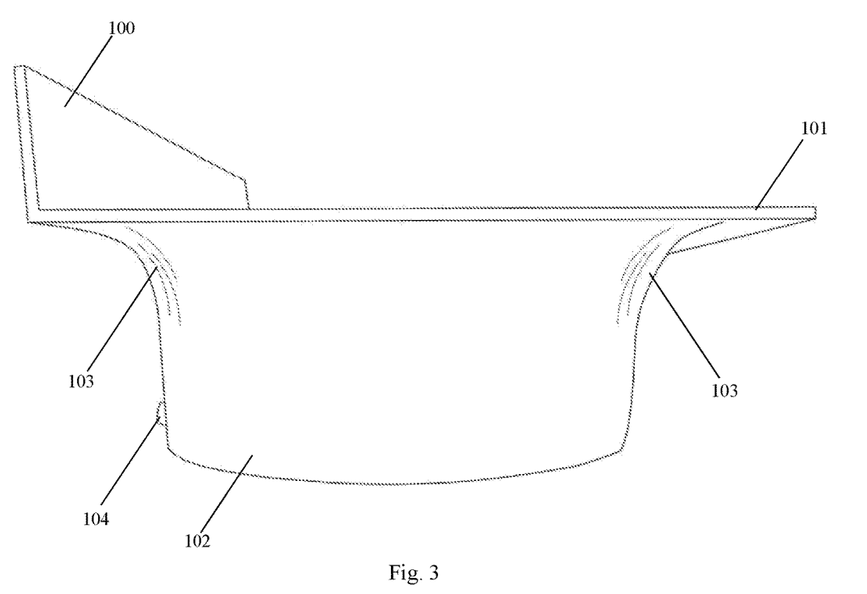
FIG. 3 is a left view of a propane tank stabilizer as according to an embodiment of the present invention.
Figure 4:
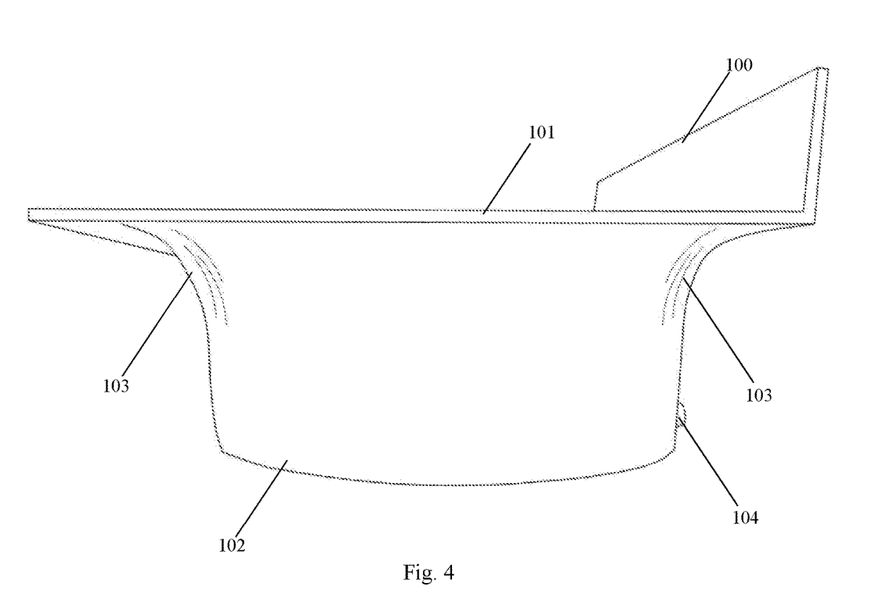
FIG. 4 is a right view of a propane tank stabilizer as according to an embodiment of the present invention.
Figure 5:
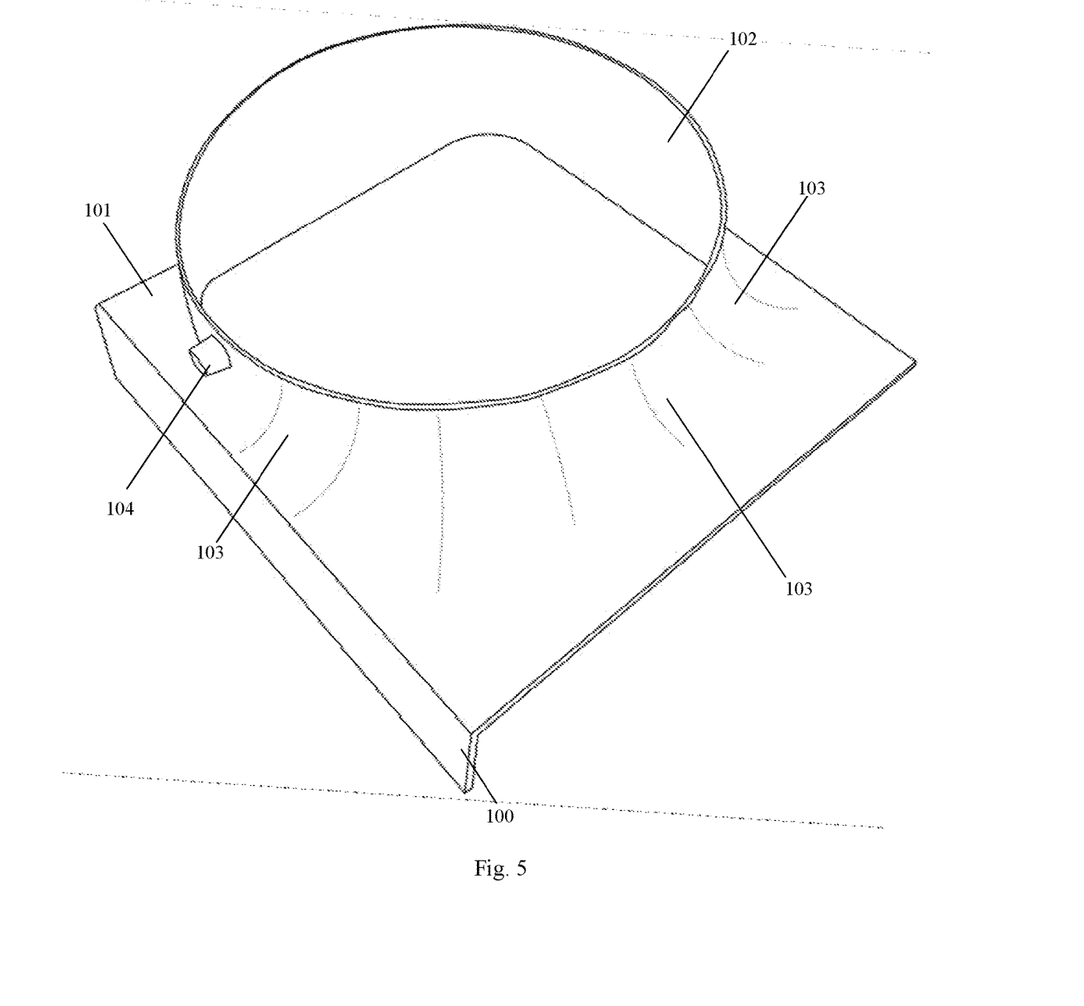
FIG. 5 is a perspective view of a propane tank stabilizer as according to an embodiment of the present invention.
Figure 6:
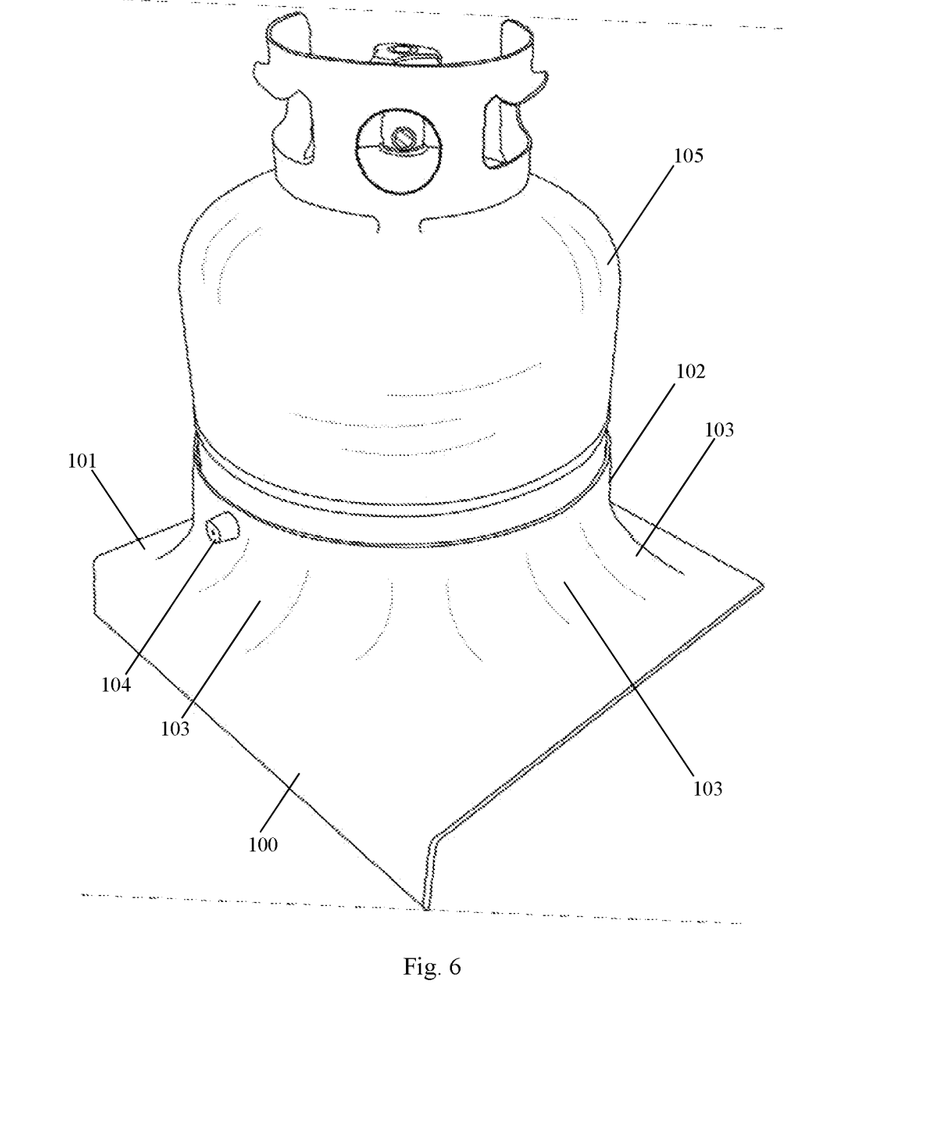
FIG. 6 is a is a perspective view of a propane tank stabilizer with a propane tank installed in the stabilizer as according to an embodiment of the present invention.

An embodiment of the present invention is designed to be used in a pickup truck. First the tailgate of pickup needs to be opened up. Then the propane tank stabilizer is placed in bed of pickup with the retention flange (100) being shaped to be inserted into the opening between tailgate and bed of pickup which is created when tailgate is opened. The propane tank (105) is then placed into the top of stabilizer & slides to bottom resting on the collar (102) and pickup bed. The tailgate is then closed creating a pinch point around the retention flange (100). This completely prohibits the tank (105) from sliding and tipping over without the aid of any tie downs or straps when transporting. When transporting is completed you simply reverse process. Said stabilizer can also be used to stabilize tank (105) even when not in transport & out of pickup to minimize risk of tipping over during use.

Additionally: the stabilizer is shaped to easily stabilize other items that are being transported in bed of pickup. With the 90° angle of the retention flange (103) being placed into opening when tailgate is open the base could be made in different dimensions as to accommodate other items such as camp stove, keg of beer, water containers paint bucket, or just buckets that have loose items in them. A nylon or similar type material could be made to slip over opening of the collar (102) to hold loose items such as paint brushes, carpentry tools or nails and screws that are loose.

Also, an embodiment of the present invention could be used in various ways as a grip for tie downs for motor bikes, ATV'S, garbage cans while transporting.

Those skilled in the art will appreciate that the conception, upon which this disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

Therefore, the foregoing is considered as illustrative only of the principles of a method for creating assignments in an incident command system. Further, since numerous modifications and changes will readily occur to those skilled in the art, it is not desired to limit the method for creating assignments in an incident command system to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

What is claimed is:

1. An apparatus for stabilizing a propane tank comprising:
   A base, a collar, a retention flange, and a transition area;
   wherein the base is flat and square-shaped,
   wherein the collar has the shape of an open circle,
   wherein the retention flange is a rectangular piece of material that is attached in a roughly 90-degree downward orientation to the base and is the same length as the base,
   wherein the transition area is a curved piece of material that joins the base and the collar in a roughly 90-degree orientation and surrounds the collar,
   wherein the base is shaped so that the collar is open in an upward direction when the apparatus is placed on a flat surface,
   and wherein the retention flange is shaped to fit in the gap between a tailgate and bed of a pickup truck when the tailgate of the truck is open or when the tailgate of the truck is closed.

2. The apparatus of claim 1 further comprising a tightening knob that is attached to the collar.

3. The apparatus of claim 1 wherein the base has a hole of approximately 14" diameter cut out of its center.

4. The apparatus of claim 1 wherein the retention flange is formed of the same material of the base and the collar.

5. The apparatus of claim 1 wherein the retention flange is a portion of the base that has been bent in an approximately 90-degree downward orientation from the remainder of the base.

6. The apparatus of claim 1 wherein the collar has a diameter that is slightly larger than a 20 lb propane tank.

7. A stabilizer for stabilizing a propane tank during transport comprising:

A square base that is shaped to lie flat against the bed of a pickup truck, one side of the base having a transition area connected thereto, the transition area being curved so that a collar also connected to the transition area is oriented 90-degrees to the plane of the base, the collar being elevated slightly above the base by the transition area, the collar being a circle with an opening into which a propane tank is inserted,     and a retention flange that is formed to fit between a tailgate of a pickup truck and the bed of the pickup truck, the flange being attached to one end of the base with the plane of the flange being at a perpendicular angle to the plane of the base.

8. The stabilizer of claim 7 wherein the collar further comprises a tightening knob, the tightening knob having a threaded bolt that passes through the collar.

9. The stabilizer of claim 8 wherein the base, the transition area, and the collar are formed from a single piece of material.

10. The stabilizer of claim 9 wherein the material is a plastic.

11. The stabilizer of claim 9 wherein the material is sheet metal.

12. The stabilizer of claim 8 wherein the retention flange is a portion of the base that has been bent in a roughly 90-degree angle to the remainder of the base.

13. The stabilizer of claim 8 wherein stabilizer has a funnel shape from top to bottom such that the diameter of the collar at the top of the collar is greater than the diameter of the collar at the bottom of the collar.

14. The stabilizer of claim 8 wherein the a rubber coating is applied to the exterior surfaces of the stabilizer.

15. A stabilizer for transporting propane tanks in the bed of a pickup truck comprising:

a flange that fits between the bed and tailgate of the pickup truck, the flange being formed to provide stability for the stabilizer so that the stabilizer and a propane tank inserted into the stabilizer do not slide in the bed of the truck when the truck is in motion;

a square base that is formed so that the stabilizer and a propane tank inserted into the stabilizer are stably supported in the truck during transport, the base being larger than the diameter of the propane tank;

a transition area that is attached to the base and curves upwards away from the base, the transition area having a circular shape and tapers down from larger diameter to a smaller diameter as the transition area extends away from the base,     and a collar that is attached to the transition area where the transition area has its smallest diameter, the collar having a diameter that allows a propane tank to be securely inserted into the stabilizer during transport, the collar being circular in shape, and     the stabilizer being constructed of a metal or a plastic.

16. The stabilizer of claim 15 wherein the flange is shaped to provide stability to the stabilizer if the stabilizer is used as a tie-down for rope or ratchet straps.

17. The stabilizer of claim 15 wherein the collar is spot-welded to the transition area.

18. The stabilizer of claim 15 wherein the transition area completely surrounds the collar.

19. The stabilizer of claim 18 wherein the transition area and the collar are formed from the same piece of material.

20. The stabilizer of claim 15 wherein the base has a hole of approximately 14" cut from it so that the base of a propane tank passes through the base when the stabilizer is in use.

\* \* \* \* \*